UNITED STATES PATENT OFFICE.

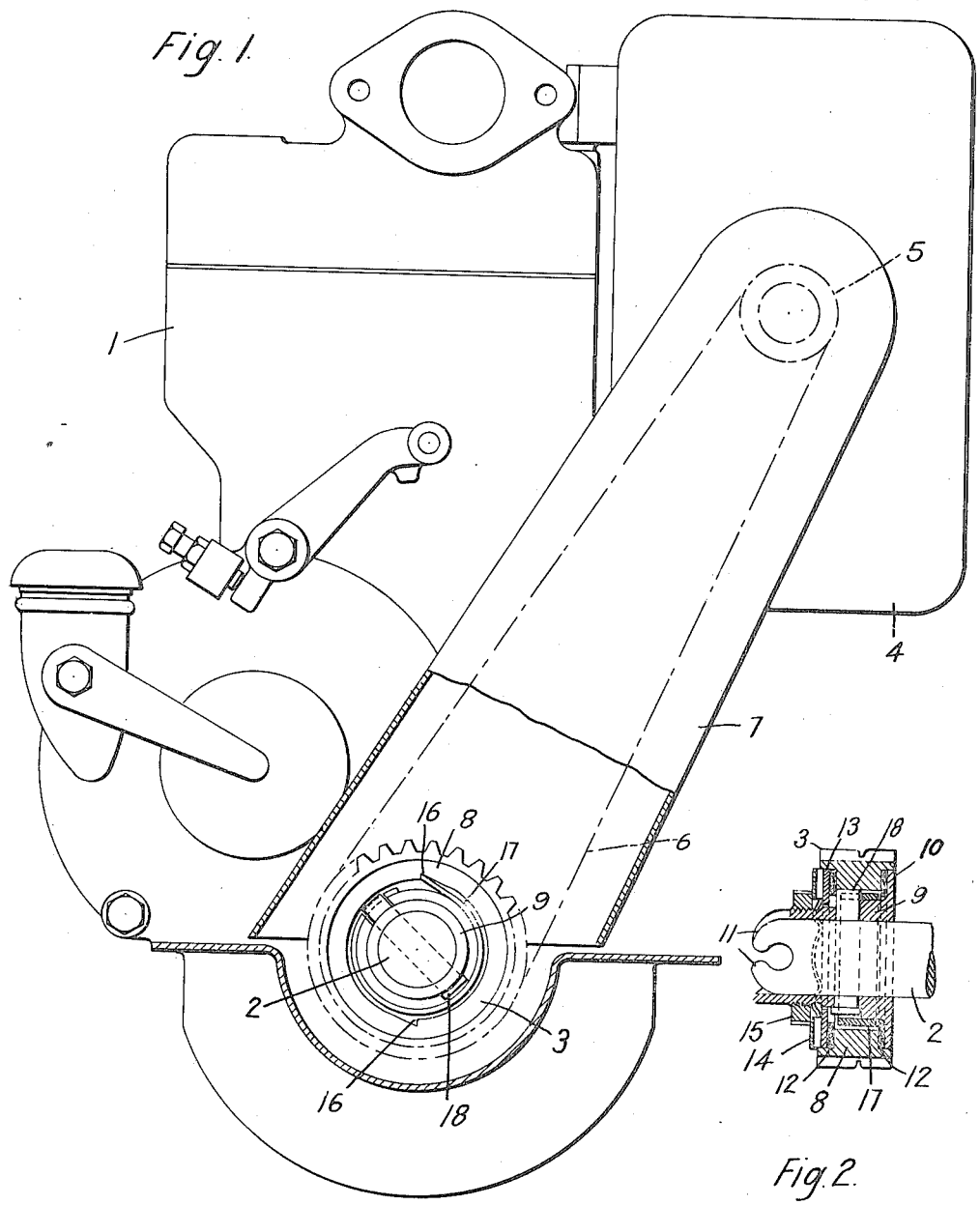

MAX E. GYSEL, OF WILKINSBURG, PENNSYLVANIA, ASSIGNOR TO WESTINGHOUSE ELECTRIC AND MANUFACTURING COMPANY, A CORPORATION OF PENNSYLVANIA.

GEAR-WHEEL.

1,184,849.  Specification of Letters Patent.  Patented May 30, 1916.

Application filed October 9, 1915. Serial No. 54,950.

*To all whom it may concern:*

Be it known that I, MAX E. GYSEL, a citizen of the Republic of Switzerland, and a resident of Wilkinsburg, in the county of Allegheny and State of Pennsylvania, have invented a new and useful Improvement in Gear-Wheels, of which the following is a specification.

My invention relates to gear wheels and particularly to such devices as embody relatively movable parts.

My invention has for its object to provide a gear wheel of the above indicated character in which the parts are operatively connected to yieldingly permit unlimited relative movements in one direction and to permit limited relative movements in the opposite direction.

In the operation of dynamo-electric machines that are operatively connected to internal-combustion engines to operate at one speed ratio, either as a motor or as a generator, it is the present practice to employ sprocket wheels and chains as driving mechanisms. It has been found necessary, in such arrangements, to provide a yielding driving connection between the engine and the dynamo-electric machine in order that the chain may not be subjected to excessive strains.

When the engine shaft is rotated by the dynamo-electric machine, the variations in the torque necessary to crank the engine render a yielding connection essential. The sudden changes in speed of the engine when the latter operates under its own power are sufficient to break the sprocket chain because of the inertia of the armature of the dynamo-electric machine. In the operation of starting the engine, the variations in speed of the engine shaft are limited to those caused by the engine pistons approaching or receding from the several points of compression. The principal variations occur when the engine is operating under its own power and the speed of the engine is dependent upon the supply of fuel, the connection of the engine clutch and other operating conditions.

I have provided a gear wheel which comprises a hub member and a toothed member that are arranged for relative movements. The members of the gear wheel are connected by a ratchet mechanism comprising a resilient pawl to constitute a substantially positive driving connection between the parts, but which permits limited relative movements. This connection is operative when the dynamo-electric machine operates as a motor to start the engine. The toothed member and the hub member are also connected by washers of friction material to yieldingly connect the parts of the gear wheel for unlimited relative movements when the power transmitted from one part to the other exceeds a predetermined amount. This connection is effective both during the operation of the dynamo-electric machine as a motor to crank the engine and the operation of the engine under its own power to drive the dynamo-electric machine as a generator.

The details of my invention will be described in connection with the accompanying drawing in which—Figure 1 is an end view, partially in elevation and partially in section, of an internal-combustion engine with my invention applied thereto, parts of the gear wheel being omitted. Fig. 2 is a view, in longitudinal section, of the gear wheel.

Referring particularly to Fig. 1, an internal-combustion engine 1 has a crank shaft 2 upon which is mounted a yieldable gear wheel 3. A dynamo-electric machine 4, which is adapted to operate either as a motor for starting the engine or as a generator for supplying current to lighting and ignition circuits or for charging a storage battery, is secured to the internal-combustion engine 1 by any suitable means. A pinion or sprocket wheel 5, with which the armature shaft of the dynamo-electric machine 4 is provided, is operatively connected to the gear wheel 3 by a chain 6 which may be, for example, of the well-known Morse type. The gear wheels 3 and 5 and the chain 6 are inclosed by a suitable casing or guard 7.

Referring to Figs. 1 and 2, the gear wheel 3 comprises a toothed member 8 and a hub member 9 that is provided, at one end, with a flanged portion 10 and, at the other end, with a pair of inclined projections or clutch jaws 11 for engagement by the usual hand crank. A washer 12 of fiber or other suitable friction material is disposed between the flange 10 and one end of the toothed member 8. A similar washer 12 is disposed between the other end of the toothed member 8 and a metal washer 13 that is held in place by a corrugated spring 14 and a nut 15 that has a screw-threaded engagement with the hub 9. The pressure exerted upon the toothed member 8 by the washers 12 of friction material is adjusted by means of the nut 15.

The toothed member 8 is provided, upon its inner periphery, with a pair of notches 16 that are adapted to be engaged by a pawl 17 of resilient material such as, for example, spring steel. The pawl 17 is coiled around the hub member 9 and is retained in position by means of a pin 18 which secures the hub member 9 to the engine shaft 2. There is sufficient space between the outer diameter of the hub member 9 and the diameter of the bore of the toothed member 8 to permit the resilient pawl 17 to yield to a limited extent and thereby permit corresponding relative movements of the hub member 9 and the toothed member 8.

When it is desired to start the engine, the circuit of the dynamo-electric machine is closed by any suitable means (not shown) and the pinion 5 is rotated in a clockwise direction to rotate the engine shaft by means of the chain 6 and the gear wheel 3. It will be noted that the toothed member 8 is the driving member of the gear wheel and that power is transmitted through the notches 16 and the resilient pawl 17. The ratchet mechanism constituted by these members forms a substantially positive driving connection which, however, is yieldable to a limited degree.

The respective members of the gear wheel are also connected together by means of the friction washers 12 and the means for compressing them against the ends of the toothed member 8. When the power transmitted to the toothed member 8 by the dynamo-electric machine 4 exceeds that necessary to cause a relative movement of the parts of the gear wheel, the toothed member 8 places the resilient pawl 17 under compression, and any shock incident to the rotation of the engine shaft by the dynamo-electric machine is thereby avoided.

When the engine starts under its own power, the hub member 9 becomes the driving member, and the pawl and ratchet mechanism is rendered ineffective to prevent relative movements of the parts of the gear wheel in one direction, the power necessary to cause relative movements being determined by the adjustment of the nut 15 to regulate the frictional engagement of the several parts. By means of this arrangement, if the internal combustion engine be accelerated at a high rate, the hub member 9 may rotate more rapidly than the toothed member 8, and the tension of the chain 6 will not be such that it may be broken because of the inertia of the armature of the dynamo-electric machine 4.

It will be noted that I provide a gear wheel having relatively movable parts that are so operatively connected as to permit small relative movements in one direction and to permit unlimited relative movements in the other direction. While the gear wheel herein shown and described is particularly adapted for use in connection with an internal-combustion engine and a dynamo-electric machine in the manner above described, it may be capable of other applications. It is understood that my invention is not limited as to its use and form except as defined in the appended claims.

I claim as my invention:

1. In a gear wheel, the combination with a hub member, and a toothed member, of means for connecting said members to yieldingly permit unlimited relative movements of said members in one direction and to yieldingly permit limited relative movements of said members in the opposite direction.

2. In a gear wheel, the combination with a hub member, and a toothed member, of means for yieldingly connecting said members, said means comprising frictionally-engaging members and a ratchet mechanism comprising a resilient pawl.

3. In a gear wheel, the combination with a hub member, and a toothed member, of means for yieldingly connecting said members, said means comprising frictionally-engaging members for permitting relative movements of said members and a ratchet mechanism for yieldingly permitting limited relative movements of said members in one direction.

4. In a gear wheel, the combination with a hub member and a toothed member, of means for connecting said members to yieldingly permit unlimited relative movements of said members when the hub is the driving member and to yieldingly permit limited relative movements of said members when the hub is the driven member.

5. In a wheel, the combination with two concentrically disposed members, of means for operatively connecting said members to yieldingly permit limited relative movements in one direction and to yieldingly permit unlimited relative movements in the opposite direction.

In testimony whereof, I have hereunto subscribed my name this 28th day of Sept. 1915.

MAX E. GYSEL.